United States Patent
Nagarajan et al.

(10) Patent No.: US 6,683,852 B2
(45) Date of Patent: Jan. 27, 2004

(54) CALL ADMISSION CONTROL METHODS AND APPARATUS FOR IMPROVING ROUTE SELECTION IN PACKET NETWORKS

(75) Inventors: Ramesh Nagarajan, Somerset, NJ (US); Yung-Terng Wang, Marlboro, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 10/264,415

(22) Filed: Oct. 4, 2002

(65) Prior Publication Data

US 2003/0063624 A1 Apr. 3, 2003

Related U.S. Application Data

(63) Continuation of application No. 09/212,067, filed on Dec. 15, 1998.
(51) Int. Cl.[7] .............................................. H04J 12/25
(52) U.S. Cl. ....................................................... 370/235
(58) Field of Search ................................ 370/229, 230, 370/231, 232, 233, 234, 235, 237, 238, 252, 254, 395, 389, 468

(56) References Cited

U.S. PATENT DOCUMENTS

| | | | | |
|---|---|---|---|---|
| 5,179,556 A | * | 1/1993 | Turner | 370/233 |
| 5,357,507 A | * | 10/1994 | Hughes et al. | 370/234 |
| 5,659,544 A | * | 8/1997 | La Porta et al. | 370/312 |
| 5,751,708 A | * | 5/1998 | Eng et al. | 370/395.42 |
| 5,838,663 A | * | 11/1998 | Elwalid et al. | 370/233 |
| 5,933,412 A | * | 8/1999 | Choudhury et al. | 370/218 |
| 6,016,319 A | * | 1/2000 | Kshirsagar et al. | 370/410 |
| 6,072,773 A | * | 6/2000 | Fichou et al. | 370/230 |
| 6,356,564 B1 | * | 3/2002 | Bawa et al. | 370/468 |

* cited by examiner

Primary Examiner—Wellington Chin
Assistant Examiner—William Schultz (57) ABSTRACT

A packet switch is configured for determining an equivalent bandwidth for use in GCAC. The equivalent bandwidth definition of the invention is derived by multiplying some known connection parameter such as, for example, a selected bandwidth value by a multiplier preferably computed and stored in look-up tables according to the invention. The appropriate multiplier for a given connection request associated with a call may then be found by accessing sets of the look-up tables based on one or more connection and/or network parameters. For each link in a path considered during GCAC, the product of the multiplication of the selected bandwidth value and the multiplier is then compared to the available bandwidth, AvCR, of the path links to determine if the path satisfies the connection request.

37 Claims, 5 Drawing Sheets

CALL ADMISSION CONTROL METHODS AND APPARATUS FOR IMPROVING ROUTE SELECTION IN PACKET NETWORKS

CROSS REFERENCE TO RELATED APPLICATIONS

This application is a continuation of pending U.S. application Ser. No. 09/212,067, filed Dec. 15, 1998, which is incorporated by reference herein. This application is related to the patent application identified as U.S. Ser. No. 09/212,066, entitled: "Route Caching Methods And Apparatus For Improving Route Selection In Packet Networks," and filed on Dec. 15, 1998.

FIELD OF THE INVENTION

The invention relates to methods and apparatus for improving routing in packet networks and, more particularly, to methods and apparatus for improving generic call admission control and for reducing computational loads associated with route selection.

BACKGROUND OF THE INVENTION

It is known that ATM (Asynchronous Transfer Mode) technology has been undergoing intense standardization efforts in recent years under both the ITU (International Telecommunications Union) and the ATM Forum. For example, a set of specifications relating to routing and signaling protocols for an ATM private network-to-network interface (PNNI) has been developed by the ATM Forum, i.e., ATM Forum, "Private Network-Network Specification Interface 1.0," af-tm-0055.000 (March 1996).

In the PNNI framework, network nodes (switches) constantly send updates on the status of their local links to all other nodes in the network. These updates are sent periodically and/or triggered by changes in link attributes such as the available bandwidth or cell rate (AvCR) of the link. While some link attributes, such as available bandwidth, change frequently as calls arrive and depart, certain others remain relatively constant. For example, administrative weights (AW) associated with links fall into the latter category. These weights can be manipulated by network operators via the network management system and are meant to guide the route selection algorithms in selecting least AW cost paths. Based on the updates received, each network node constructs its own topological view of the network. Routes through the network are independently computed by each originating (source) node based on its view of the network. Upon a call origination, the source node needs to check if the candidate route satisfies the requirements of the current call in terms of, for example, quality of service (QoS) requirements given its traffic descriptors. QoS requirements include, for example, bandwidth and delay requirements. This check is referred to as generic call admission control (GCAC). In addition, network nodes along the path of the call (intermediate nodes) perform their own call admission control referred to as local call admission control (LCAC).

It is known that there are numerous performance issues in PNNI routing. They can be broadly categorized as addressing two types of limiting resources, namely: real-time resources, e.g., call processor (CPU) utilization in the switch control complex; and the cell transport resources, e.g., transmission bandwidth of a link. The demands for real-time resources stem from handling call set-up/teardowns including path selection at the source switches, performing call admission control at the local switches, and processing incoming and outgoing link state advertisements. The performance is measured primarily in terms of the amount of real-time resources required to handle a given load and the resultant processing delay characteristics. Given a network, this performance is a strong function of the design/implementation of the related algorithms, the computational cost of the chosen algorithms and the settings of the tunable parameters. Limiting transport resources include switch cell buffers and link bandwidth required to support the desired QoS of the admitted calls.

Due to the source routing nature of PNNI, the design of the routing algorithm has a direct impact on how efficiently the network links are utilized. Further, given a distributed architecture in which switches, possibly from different vendors, independently compute routes, ill-advised route selections may result in excessive crankbacks or rejections of call set-up requests and, subsequently, create unnecessary real-time load on the call processors associated with the node or switch.

Under the PNNI architecture, a source switch has to select a candidate path such that there is a reasonably high probability for all the switches along the accepted path to accept the call. Otherwise, as mentioned above, a substantial amount of crankback or rejection can result which unnecessarily consumes network and switch resources while increasing call set-up delays. It is therefore necessary for a source switch to estimate the availability of various resources at other switches within the network. It is known that such estimation can only be based on the limited and possibly outdated information derived from previous switch update advertisements. The exact penalty and tradeoff depends on the frequency of link state update advertisements and the algorithms used for GCAC at the source switch and LCAC at the intermediate switches.

Assume a link of capacity C and homogenous connections (calls) arriving at the link. Let $N_{max}$ denote the maximum number of connections that can be supported on the link according to the LCAC. Let $ebw_{lcac}=C/N_{max}$ denote the effective bandwidth connection according to LCAC. Similarly, let $ebw_{gcac}$ denote the per-connection effective bandwidth according to GCAC. Let N(t) denote the current number of connections admitted to the link. Then $C-N(t)*ebw_{lcac}$ is the available bandwidth, denoted as AvCR, at the link and is the value advertised in the link state update by the node to which the link is coupled. Note that in GCAC, it is this AvCR value that is compared to the effective connection bandwidth computed by the GCAC. Thus, the probability that a connection is blocked by the GCAC is given by:

$$P_{block} = P(C - N(t)*ebw_{lcac} < ebw_{gcac})$$
$$= P(N(t)*ebw_{lcac} < C - ebw_{gcac})$$
$$= P(N(t) > N_{max} - ebw_{gcac}/ebw_{lcac})$$

These relationships suggest that if $ebw_{gcac} > ebw_{lcac}$, the GCAC is conservative as compared to LCAC, and if $N_{max}$ is much larger than $ebw_{gcac}/ebw_{lcac}$, which is typically the case, then loss of utilization due to GCAC may be negligible. However, if the $ebw_{gcac}$ is estimated by the source node to be too conservative, i.e., using a higher effective bandwidth than necessary so that there is a buffer, there is a risk that links associated with intermediate switches would not be utilized. On the other hand, if GCAC is aggressive compared to LCAC, then depending on the difference, there can be an undesirably large number of crankbacks. In fact, even if the GCAC and the LCAC are exactly the same, i.e., $ebw_{gcac}=ebw_{lcac}$, it is still possible to get crankbacks due, for example, to delays in the link state updates reaching all network nodes and the fact that the updates are typically only generated when there are significant changes in the network state.

Since a path chosen by a source node will likely pass through more than one link in order to get to the destination node, the available bandwidth associated with the path is characterized by the link having the smallest available bandwidth, as illustrated by the $P_{block}$ equation above. Thus, in order for the source node to characterize a path as sufficient to set-up the call on, the relationship $AvCR \geq ebw_{gcac}$ must be satisfied for each link. Various ATM classes of service choose an equivalent bandwidth ($ebw_{gcac}$) definition. For example, as suggested in the above-referenced PNNI standard, the CBR (constant bit rate) class uses the PCR (peak cell rate) as an equivalent bandwidth. The VBR (variable bit rate) class uses the relationship of SCR[1+(PCR/SCR)], where SCR is the sustained or mean cell rate. The ABR (available bit rate) class uses the MinCR (minimum cell rate). However, each of these definitions may range from too conservative to too aggressive and, thus, suffer from the drawbacks mentioned above. Accordingly, it would be highly advantageous to provide methods and apparatus for selecting an appropriate GCAC equivalent bandwidth which results in minimization of crankbacks, while maximizing utilization of intermediate links.

Furthermore, it is known that the route selection at the source node requires a non-trivial amount of real-time resources to perform the required computations. The conventional process provides that when a call comes in to a source node, there is typically only one path stored for the call to reach the desired destination node. The source node tests all the links in this path to determine if the path satisfies the requirements, e.g., QoS and traffic descriptor, of the call. If the path satisfies the requirements, the call is set-up on this path. However, if the stored path does not satisfy the requirements and the source node has knowledge of the current network topology, the source node computes and tests a new path. This is repeated until a suitable path is found.

A significant problem with the above procedure is that finding (computing) a new path each time a new call comes in to the source node burdens the processing resources at the source node. Disadvantageously, the processor of the source node may be the reason that a call is blocked. Accordingly, it would be highly advantageous to provide methods and apparatus for reducing the computational load on the processing resources of the source node during route selection.

SUMMARY OF THE INVENTION

The present invention provides methods and apparatus for performing GCAC which advantageously results in minimization of crankbacks and maximization of link utilization. In one aspect of the invention, a packet switch is configured for determining an equivalent bandwidth for use in GCAC. The equivalent bandwidth definition of the invention is derived by multiplying some known connection parameter such as, for example, a selected bandwidth value (e.g., in the case of ATM CBR service, the PCR) by a multiplier preferably computed and stored in look-up tables according to the invention. The appropriate multiplier for a given connection request associated with a call may then be found by accessing sets of the look-up tables based on one or more connection parameters, for example, a QoS parameter such as a delay requirement and/or a traffic descriptor. For each link in a path considered during GCAC, the product of the multiplication of the selected bandwidth value and the multiplier is then compared to the available bandwidth, AvCR, of the link. If the AvCR is greater than or equal to the product, then the connection is set-up on that path, if not, the connection request is rejected. In another aspect of the invention, the GCAC is performed as a function of network-related parameters such as, for example, the number of connections associated with a given link at a given point in time and the current utilization of the link capacity.

Furthermore, the present invention provides methods and apparatus for reducing the computational load on processing resources of a source node during route selection. In one aspect of the invention, a packet switch is configured with the capability of caching more than one candidate path of a network. The packet switch is also configured for testing at least one cached candidate path upon receipt of a connection request associated with a call to determine if the cached candidate path satisfies the connection request. If one of the cached paths satisfies the connection request, then the call is set-up on that path. If not, the packet switch performs a real-time computation to find a new path. If a new path which satisfies the connection request is found, the call is set-up thereon and the newly computed path is cached according to a predetermined ordering/replacement policy. The policy may be a function of certain metrics such as, for example, the administrative weight and the available bandwidth associated with a path.

DETAILED DESCRIPTION OF PREFERRED EMBODIMENTS

Certain embodiments of the invention will be described below in the context of a PNNI framework; however, it should be understood that the invention is not limited to such applications or system architectures. Rather, the teachings described herein are applicable to routing schemes in any type of packet-based network including any ATM or IP applications and system architectures. Further, the term "processor" as used herein is intended to include any processing device, including a CPU (central processing unit), which may be utilized in a network node, switch or router. Also, the term "memory" as used herein is intended to include memory associated with a processor or CPU, such as, e.g., RAM, ROM, a fixed memory device (e.g., hard drive), or a removable memory device (e.g., diskette). In addition, the processing device may include one or more input devices, e.g., keyboard, for inputting data to the processing unit, as well as one or more output devices, e.g., CRT display and/or printer, for providing results associated with the processing unit. Further, it is to be understood that one or more processing devices within the network may share associated memory resources. Accordingly, the software instructions or code for performing the methodologies of the invention, described herein, may be stored in one or more of the associated memory devices (ROM, fixed or removable memory) and, when ready to be utilized, loaded into RAM and executed by a CPU. Still further, it is to be appreciated that the term "call" as used herein is synonymous with the term "connection." Likewise, the terms "node" and "switch" as used herein are interchangeable.

Figure 1:
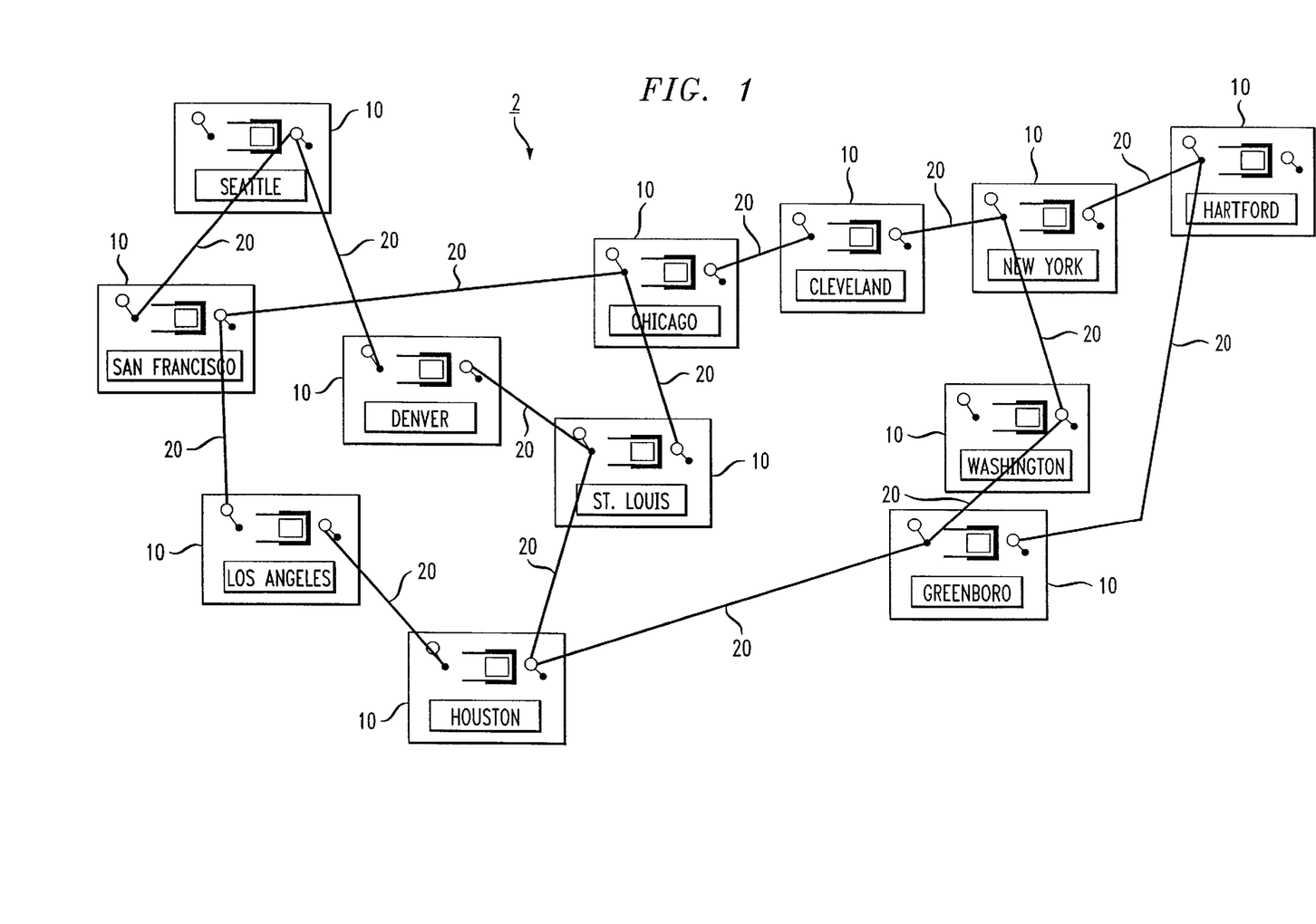
FIG. 1 is a block diagram of an exemplary network topology for implementing the present invention.

Referring to FIG. 1, a block diagram of an exemplary network topology in which the present invention may be implemented is shown. The network 2 is based on the NSFNET backbone in 1994, i.e., Ren-Hung Hwang, "Routing in High-speed Networks," Ph.D. Thesis, Department of Computer Science, University of Massachusetts, Amherst (1993). The network 2 includes a plurality of nodes 10 located in a variety of cities in the United States. The nodes 10 are coupled by a plurality of links 20. It is to be appreciated that the links 20 may include, for example, wireless paths, conventional telephone line paths, fiber optic paths, or a combination thereof. The teachings of the invention described herein are not limited to the types of links connecting nodes nor to this particular network. That is, the invention is applicable to smaller (e.g., local) and larger (e.g., global) scale networks. It is also to be appreciated that any node 10 in the network 2 at which a call originates can serve as a source node, provided it has a stored knowledge of the network topology.

Figure 2:
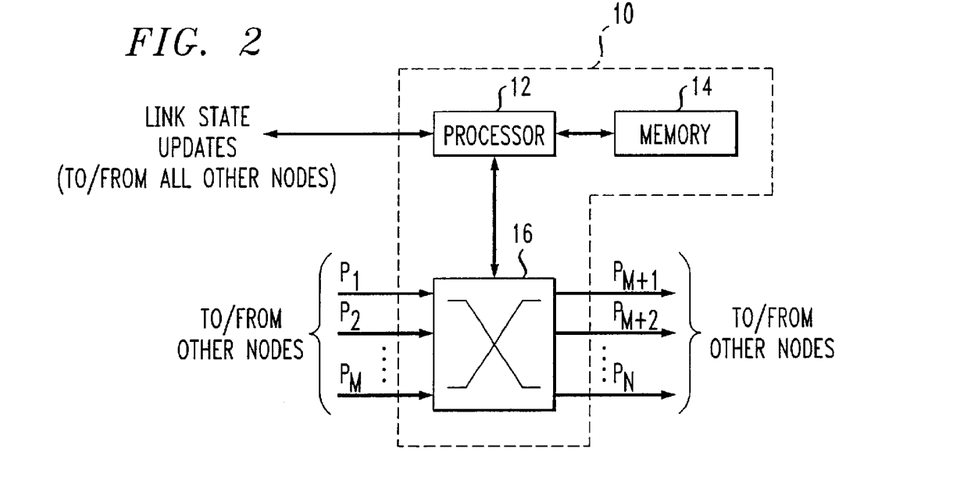
FIG. 2 is a block diagram of a network node for implementing the present invention.

Referring to FIG. 2, a block diagram of an embodiment of a node 10 is shown. Particularly, each node 10 includes a processor 12 and memory 14 operatively coupled thereto. The node 10 also includes a switching circuit 16 operatively coupled to the processor 12. It is to be appreciated that the type of switching circuit 16 used in the node 10 is not critical to the invention and may be of any known type that is responsive to the processor 12. By way of example, the physical internal structure of node 10 may be similar to the types of switches manufactured by FORE Systems or Newbridge. However, it is to be understood that the invention is not limited to these particular switch structures. The switching circuit 16 includes ports $P_1$ through $P_N$, that is, $P_1$ through $P_M$ ports on one side of the switch internally connectable to $P_{M+1}$ through $P_N$ ports on the other side of the switch. Depending on the interconnectivity of the network 2, any port of a node 10 may be connected via a link 20 to any other node 10. It is to be appreciated that the links 20 are preferably bidirectional. For example, referring back to FIG. 1, it can be seen that the "SanFran" node has ports respectively coupled to ports of the "Seattle" node, the "LA" node, and the "Chicago" node. Further, for example, the "St. Louis" node has ports respectively coupled to ports of the "Denver" node, the "Houston" node, and the "Chicago" node. Thus, calls may travel in both directions on the link 20 between any two nodes. It should be understood that while each node 10 may have M distinct ports as shown in FIG. 2, for the sake of simplicity, the nodes in FIG. 1 do not illustrate, in all cases, the distinction between individual ports.

Further, it is to be appreciated that a path may include a single link, e.g., sending a call from the "Washington" node to the "New York" node, or multiple links, e.g., sending a call from the "LA" node, through the "Houston" node, to the "Greensboro" node. Still further, the processor 12 in FIG. 2 shows a bidirectional coupling to all other nodes on which it receives and transmits link state update advertisements. This additional interconnection between nodes is not shown in FIG. 1, for the sake of simplicity. However, it should be understood that the update advertisements may alternatively be transmitted over the same links as data, e.g., links 20, in which case additional interconnection would not be necessary.

It is to be appreciated that the processor 12, in cooperation with the memory 14 and, as will be discussed later in a route caching embodiment, a cache, executes the methodologies of the invention described herein in order to instruct the switching circuit 16 as to which path the call is to be set-up on and transmitted over. As such, the remainder of the detailed description is divided into two sections detailing embodiments of such methodologies of the invention relating to GCAC and route caching.

Generic Call Admission Control

As mentioned above, proper selection of the GCAC equivalent bandwidth ($ebw_{gcac}$) is important to the efficient performance of the network. If the equivalent bandwidth is chosen too conservatively, otherwise sufficient links associated with intermediate nodes will not be utilized thereby decreasing the efficiency of the network. On the other hand, if the equivalent bandwidth is chosen too aggressively, then an increase in crankbacks will result, which also decreases the efficiency of the network. It is known that conventional definitions of equivalent bandwidth are estimated from certain parameters. For example, as mentioned above, the CBR class of ATM service utilizes PCR as the equivalent bandwidth in GCAC computations. That is, the GCAC in CBR service compares the available bandwidth (AvCR) of a given link in a path with the PCR. If the AvCR is greater than or equal to the PCR, then the path is selected and the call set-up thereon. However, values such as the PCR may not represent a conservative enough definition of equivalent bandwidth. This is because the information provided by the intermediate nodes in link status update advertisements may not necessarily represent current conditions at that node. Thus, use of PCR does not serve as an adequate definition of equivalent bandwidth and can result in crankbacks and, alternately, under utilization of intermediate nodes and links in the network. Also, the LCAC estimate may be larger than the PCR, especially when delay requirements are stringent. Likewise, as mentioned above, ABR service uses MinCR as a definition. Since MinCR represents a minimum bandwidth, such a definition may be too aggressive. Likewise, using a mean cell rate (SCR), as is the case with VBR service, may also not represent an equivalent bandwidth that maximizes the efficiency of the network.

Advantageously, the methods and apparatus of the present invention provide for uniquely performing GCAC as a function of certain connection (call) parameters and, alternatively, in addition, certain network parameters, such that crankbacks are minimized and intermediate node and link utilization is maximized. In one embodiment, the invention includes defining a multiplier (hereinafter also referred to as MULT), determined according to such call parameters, which is multiplied with a connection parameter such as, for example, the PCR. Accordingly, the product of the multiplication represents an improved definition of equivalent bandwidth which provides the above-mentioned balance between conservative and aggressive estimation.

Figure 3:
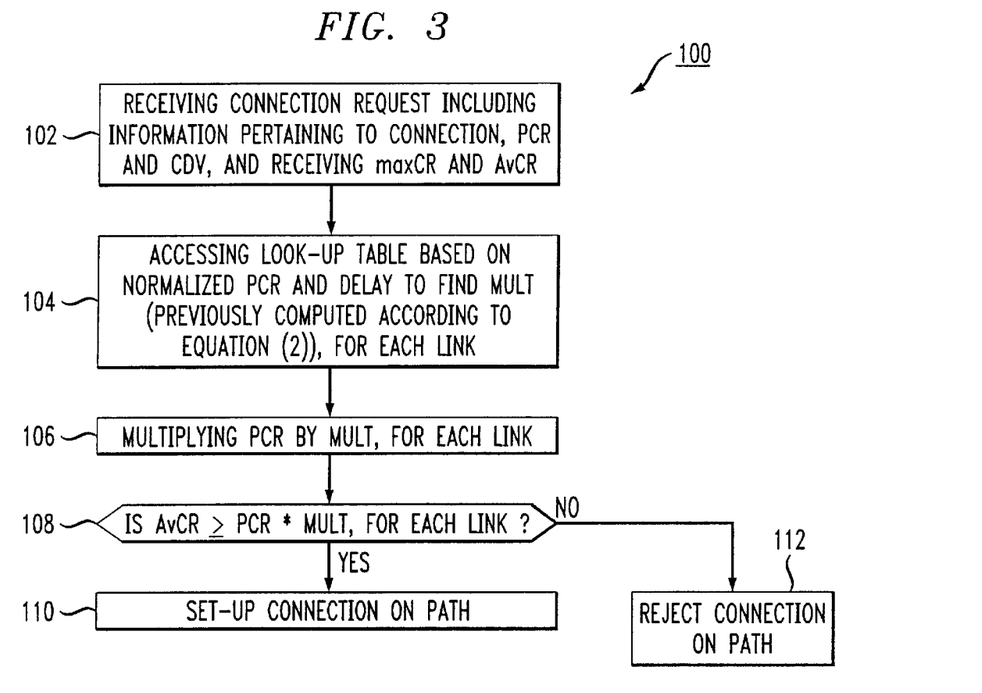
FIG. 3 is a flow chart of a method of implementing GCAC according to an embodiment of the present invention.

Referring now to FIG. 3, a flow chart of a first embodiment of a method for calculating an equivalent bandwidth in GCAC according to connection parameters is shown. As mentioned, it is to be appreciated that the method 100 may be implemented by the processor 12 (FIG. 2) in conjunction with its associated memory 14 in a node 10 serving as a source node.

First, in step 102, a node 10 receives a connection (call) request from a call source. Since that particular node is the originating node for the connection, that node is considered the source node. According to the destination node of the connection, the source node must determine a best route or path, through intermediate nodes if necessary, of the network. It is known that the connection request contains information pertaining to the connection to be set-up. For example, such information includes QoS (quality of service) requirements and a traffic descriptor. Such QoS requirements may include such parameters as delay and/or loss values which the connection can tolerate. For example, in CBR service, the connection may be characterized by a cell loss ratio (CLR), a cell transfer delay (CTD), and a cell delay variation (CDV), as are known in the art. The traffic descriptor may be a value such as the PCR associated with the connection. By way of example, a connection may have a PCR of 64 Kbps (kilobits per second), a delay requirement, CDV, which dictates that the probability that a delay will be greater than 3 milliseconds is less than $10^{-6}$, i.e., P(Delay>3 ms)<$10^{-6}$, where CDV equals 3 ms. Also, assuming for the sake of simplicity that the destination node is coupled to the source node by one link, the destination node may advertise a link capacity of 1.5 Mbps (megabits per second), which is representative of a T1 line. It is to be understood that the remaining steps of the inventive method 100 are performed for each link of the path. If a multi-link path is necessary, then all links of the path are tested. However, because a path with more than one link is characterized by the link with the lowest link capacity, the link capacity of such link is typically indicative of whether the path will be sufficient.

According to the invention, the method 100 includes accessing sets of look-up tables, the creation of which will be explained below, to find an appropriate multiplier, MULT, for multiplication with a connection parameter such as, for example, PCR (the conventional equivalent bandwidth definition in CBR service). The look-up tables are created and stored in the memory 14 according to the connection parameters being used to define the novel equivalent bandwidth definition. For example, below is an example of look-up table, Table I, created for the CBR service example described above.

TABLE I

| Index | Normalized PCR | MULT |
|---|---|---|
| CDV1 | 0.04 | 1.25 |
| CDV2 | 0.04 | 1.1 |

As can be seen, the look-up table is partitioned with respect to the delay (CDV) associated with the call. The delay (CDV) requirement is unique such that the source node can find the look-up table entry that corresponds to the delay associated with the received connection request. Thus, for example, CDV 1 may represent the CDV requirement that P(Delay>3 ms)<$10^{-6}$. CDV 2 is therefore another possible delay requirement that an incoming connection may require. Thus, the first column in the table represents indices to the appropriate MULT for the given parameters associated with the connection request. The second column in the table represents a normalized PCR which is the result of dividing the PCR value of the connection request by the maximum bandwidth (maxCR) or capacity of the link being tested. That is, in the above example, the normalized PCR of 0.04 results from 64 Kbps/1.5 Mbps. Given the delay requirement and the normalized PCR, the processor of the source node selects the appropriate MULT from the look-up table. It is to be appreciated that tables, such as Table I, are created containing multipliers associated with probable delay requirements and PCR (normalized) values that may be associated with incoming connection requests.

Once the appropriate MULT is determined given the connection requirements (delay and necessary bandwidth associated with the connection request), the connection parameter, in this case, PCR, is multiplied by MULT, in step 106. For example, if CDV 1 is the delay requirement specified in the above example, then step 106 results in multiplying 64 Kbps by 1.25 yielding an equivalent bandwidth of 80 Kbps. Then, in step 108, this product of PCR multiplied by MULT is compared to the available bandwidth, AvCR, reported by the intermediate node associated with the link being tested. If the AvCR is greater than or equal to the product, for each link, then the path or route is considered acceptable and the call is set-up on the path, in step 110. It is to be appreciated that the processor 12 may perform call set-up in any manner known in the art thereby instructing the switching circuit 16 as to which port the connection will be established on. On the other hand, if the AvCR is less than the product, then the path or route is rejected for that particular connection, in step 112.

The manner in which the multiplier MULT is calculated and then indexed for each entry of a look-up table in the above embodiment will now be explained. Input information used by a source node to calculate each MULT in a look-up table includes: PCR; CDV; the condition that the probability that a delay of the link is greater than the CDV time value is less than a particular probability value, e.g., P(Delay>3 ms)<$10^{-6}$; and a maximum link capacity, MaxCR, of the link with which the MULT will be associated. MaxCR may also be known for the given network topology. Given these inputs, the following equation is employed to solve for an unknown value X:

$$\sum_{x=q+1}^{X} C_x^X \left(\frac{x-q}{D}\right)^{X-x} \frac{D-X+q}{D-x+q} = 10^{-6} \quad (1)$$

where q represents the product of CDV*f*MaxCR where f is a fraction of the link capacity allocated to CBR (f ranges between 0 and 1 and is allocated for each link), and where D represents the inverse of the normalized PCR (1/normalized PCR). It is to be understood that the value f is preferably conservatively estimated or administered by a network operator. X is solved for such that the summation in equation (1) is equal to a probability likelihood value such as, for example, $10^{-6}$. One method of solving for such a value of X is via a binary search between 1 and [MaxCR/PCR]. Thus, for each CDV, or delay requirement, and normalized PCR value, a value of X is determined. Then, for each CDV and a particular normalized PCR, MULT is given by:

$$MULT = \frac{(MaxCR/X)}{PCR} \quad (2)$$

Thus, as shown in Table I, the CDV requirements serve as indices to the look-up table such that there exists a unique MULT for each CDV and PCR value. Accordingly, when a connection request is received at the source node, the source node finds the particular look-up table for a given normalized PCR and then uses the delay requirement, CDV, to find the appropriate MULT to be multiplied with the connection parameter, in this case, PCR. It should be understood that in the case where PCR is the connection parameter being used, the effective bandwidth according to the invention may also be defined as MaxCR/X. In an alternative embodiment, the value q in equation (1) may represent the product of CDV*$C_{CBR}$, where $C_{CBR}$ represents the link capacity allocated to CBR for each link.

Figure 4:
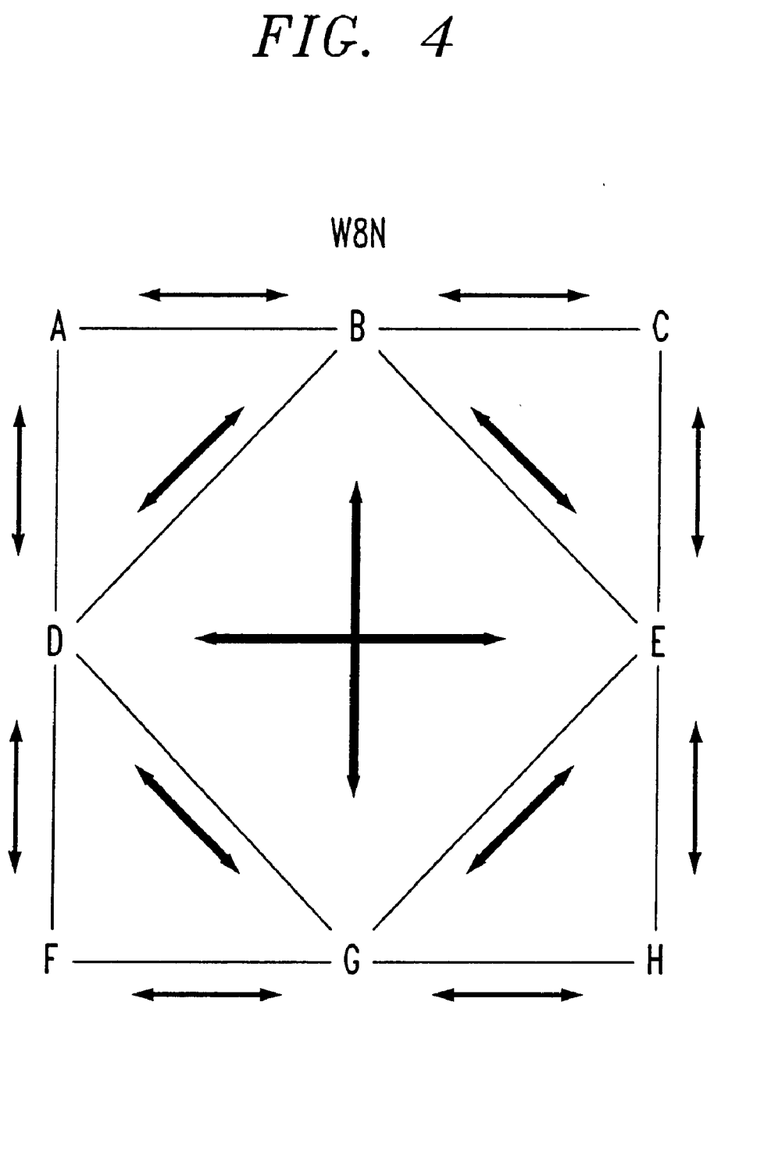
FIG. 4 is a traffic flow diagram of a sample network topology.

Accordingly, by taking into account a QoS parameter such as, for example, CDV in determining an equivalent bandwidth, GCAC, as performed by the source node according to the present invention, yields a definition of the equivalent bandwidth which results in reduced crankbacks and more efficient utilization of intermediate nodes and links in the network. Simulation on a sample network illustrates such advantageous results. Referring to FIG. 4, a sample network, labeled W8N, is shown. The arrows, in particular the thickness thereof, between the node pairs indicate the relative traffic levels in the network. It can be seen that traffic is heavy between the internal nodes, while it is relatively light between the outer node pairs. All links are assumed to have 100 Mbps of capacity. Calls are of two different types with PCR values of 1 and 10 Mbps, respectively. Mean holding times of calls are assumed to be 1 and 10 minutes, respectively. The total traffic load in erlangs of the first type (type 1) of calls is assumed to be 12 times that of the second type (type 2) of calls. The following table, Table II, illustrates simulated results with regard to crankbacks in a conventional scenario (row one) when the GCAC equivalent bandwidth is equal to the LCAC equivalent bandwidth and a scenario (row two) when the GCAC equivalent bandwidth is determined as explained above, according to the invention.

TABLE II

| $ebw_{gcac}$ | Total Crankbacks | Crankback % |
|---|---|---|
| $ebw_{gcac} = ebw_{lcac}$ | 2804 | 1.05 |
| employing MULT | 2128 | 0.79 |

It can be seen that when the conventional definition of equivalent bandwidth is used, about 1.05% of the calls are cranked back due to mismatches in the network as maintained at the source nodes and the actual network states. However, when the equivalent bandwidth employs MULT according to the invention, the crankbacks are reduced by a factor of about 25%. It is to be understood that such simulation results may be calculated on any appropriate network performance simulation platform known in the art. These particular results were calculated using a simulation platform referred to as RopeSIM™ (from Lucent Technologies, Inc. of Murray Hill, N.J.), which is based on the visual discrete-event simulation platform referred to as Q+™ (from Lucent Technologies, Inc. of Murray Hill, N.J.).

Figure 5:
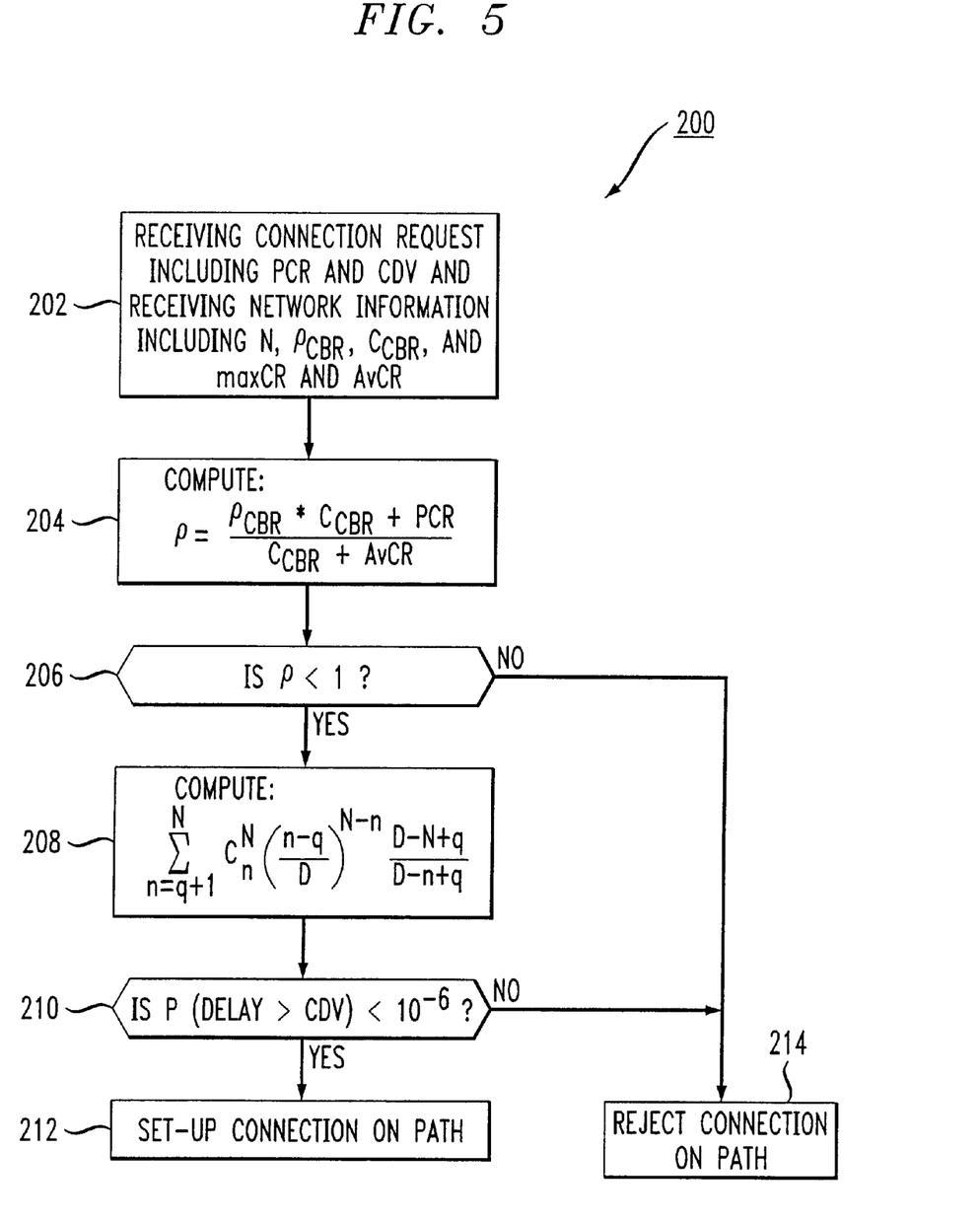
FIG. 5 is a flow chart of a method of implementing GCAC according to another embodiment of the present invention.

Referring now to FIG. 5, a flow chart of a second embodiment of a method for performing GCAC according to the invention is shown. As mentioned, it is to be appreciated that the method 200 may be implemented by the processor 12 (FIG. 2) in conjunction with its associated memory 14 in a node 10 serving as a source node.

In method 200, the source node further employs additional network information in determining whether or not a connection is to be set-up on a particular path. Specifically, the method 200 additionally uses information pertaining to: (i) the number of CBR connections currently at given link, N; and (ii) the current utilization of the CBR capacity, $\rho_{CBR}$.

Thus, in step 202, a connection request including information such as PCR and CDV is received, as well as the network-related parameters of: (i) the number of CBR connections at the link, N; and (ii) the current utilization of CBR capacity, $\rho_{CBR}$. This latter information is available to the source node from intermediate nodes as part of a link status update advertisement. Also, MaxCR and AvCR are received and/or known. Given this information, in step 204, the processor of the source node then computes a link utilization value ρ as follows:

$$\rho = \frac{\rho_{CBR} * C_{CBR} + PCR}{C_{CBR} + AvCR} \quad (3)$$

In step 206, it is determined whether ρ<1. If not, then the path is rejected (step 214) as a path on which the connection may be set-up. However, if ρ<1, then the source node proceeds to step 208. In step 208, the following summation, representing P(Delay>CDV), is computed:

$$\sum_{n=q+1}^{N} \left( C_n^N \left( \frac{n-q}{D} \right) \right)^{N-n} \frac{D - N + q}{D - n + q} \quad (4)$$

where q represents the product of $C_{CBR}$*CDV, D=N/ρ, and N is incremented by one before computing equation (4). Note that equation (4) is similar to equation (1) with the exception that the unknown value, X, solved for in equation (1) is replaced by the known value N (or actually N+1). Next, in step 210, it is determined whether or not this summation is less than a probability likelihood value, for example, $10^{-6}$ (that is, the delay requirement for the connection). If not, then the path is rejected (step 214) as a path on which the connection may be set-up. However, if P(Delay>CDV) is less than $10^{-6}$, then the call is set-up on the path (step 212).

Accordingly, by taking into account such network parameters, along with connection parameters, GCAC as performed by the source node according to this embodiment of the present invention also yields reduced crankbacks and more efficient utilization of intermediate nodes and links in the network.

Route Caching

In a conventional network arrangement, such as the network 2 shown in FIG. 1, a call comes into a source node, such as node 10 shown in FIG. 2. Assuming there is only one candidate path stored in memory 14 for each destination, during GCAC, the source node tests this path to determine if all the links in this path are sufficient to allow the call to be passed there through. If GCAC finds that the path is acceptable, the call is set-up on this path. However, if the stored path does not meet the requirements of the call, and the node at which the call originates has the network topology stored in memory 14, the source node can go through the process of computing and then testing a new path which does satisfy the requirements of the incoming call.

One significant problem associated with such a conventional route selection approach is that the process of finding (i.e., computing) a new path each time a connection request is received and the stored path is not adequate, disadvantageously uses up processor resources. As a result, the processor of the source node, itself, may become the reason that calls are blocked from being transmitted to their destination.

The methods and apparatus of the present invention provide a solution to the above and other problems associated with the conventional approach. Particularly, the present invention provides for caching multiple candidate paths (routes) in a source node, for each destination, such that the processor of the source node is less likely to be required to calculate a new path each time a call is received.

As a result, processor resources are conserved and call blocking is significantly reduced.

Figure 6:
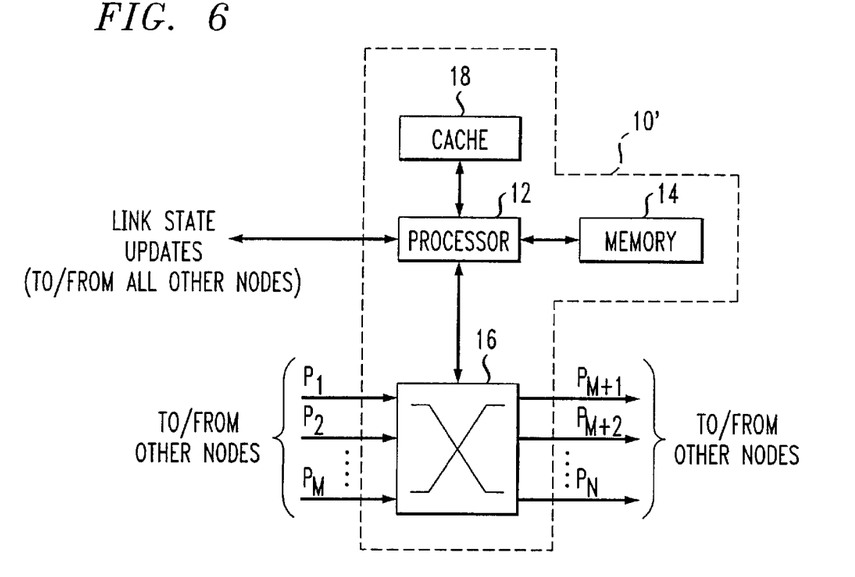
FIG. 6 is a block diagram of a network node according to an embodiment of the present invention.

Referring to FIG. 6, a block diagram of an embodiment of a node 10' employing route caching according to the invention is shown. It is to be understood that the node 10' is similar to the node 10 discussed in the context of FIG. 2, with the advantageous exception that a cache memory 18 for storing multiple routes per destination is included and operatively coupled to the processor 12 according to the invention. The elements in node 10' which have the same reference numeral as the elements in node 10 of FIG. 2 serve the same functions and therefore such functions will not be further explained. Also, each of the nodes in FIG. 1 may be configured like node 10'.

Figure 7:
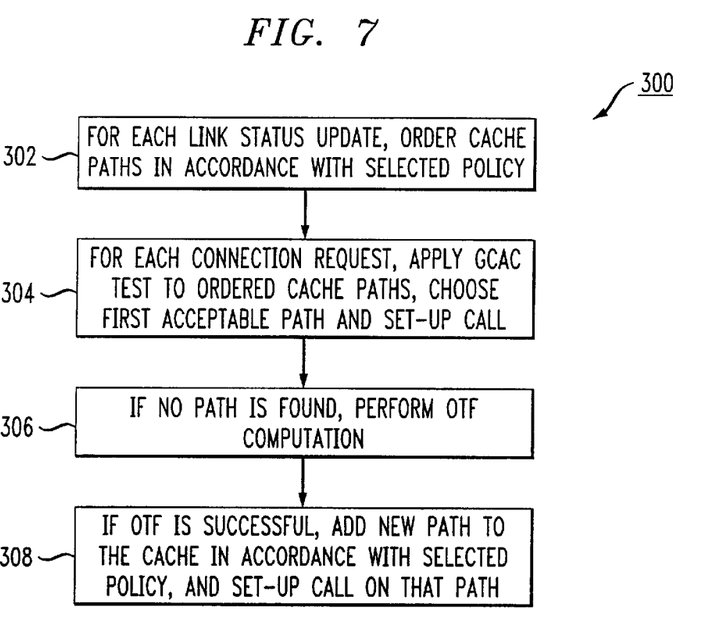
FIG. 7 is a flow chart of a route caching method according to an embodiment of the present invention.

Referring now to FIG. 7, a flow chart of a route caching method according to the invention is shown. The route caching method 300 may be performed by the processor 12 in conjunction with the cache 18. It is to be appreciated that the invention contemplates that candidate cache paths can be computed and stored in cache 18 in advance of connection requests being received or at the time the request is received. In the latter case, after a number of initial connection requests are handled, the cache will have multiple candidate paths stored for use in subsequent connection requests. Nonetheless, each time a cache path is: (i) searched for in the cache 18; (ii) added to the cache 18 in a previously unused cache location; or (iii) replaced with a new cache path, an ordering and replacement policy needs to be consulted. Examples of such policies will be given below.

Assuming that multiple paths are already stored in cache 18, in step 302, the processor 12 orders the cache paths in the cache 18 each time a link status update advertisement is received. The ordering is subject to the policy being executed by the source node 10'. For example, the policy may be a function of certain metrics such as, for example: (i) administrative weight (AW); and (ii) available bandwidth. AW values are link attributes that can be manipulated by a network operator via a network management system and are intended to guide a route selection algorithm in selecting least AW cost paths. Accordingly, the paths that the network operator desires connections to be set-up on have lower AW values than those paths that are not necessarily desired. The AW values are therefore used to prioritize the candidate path selection. Also, the AW of a path is equal to the sum of the AWs of the links that comprise the path. The other metric may be available bandwidth or AvCR. It is to be appreciated that the policy implemented by the route caching method of the invention may be set by a network operator depending on the network and its applications.

Now, when a connection request is received by the source node 10', in step 304, the cache paths are sequentially tested according to the ordering policy, until a suitable path (one that satisfies the requirements tested for during GCAC) is found. It is to be appreciated that conventional GCAC testing may be performed or GCAC testing according to the invention, for example, as described above in the context of FIGS. 3 and 5. Then, the call is set-up on that path. If no candidate path in the cache is found to be acceptable, a new path is computed, in step 306, on-the-fly (OTF) or, in other words, in real-time. It is to be appreciated that one method for computing an OTF path is by using the Dijkstra algorithm, as is known in the art. However, other known computation methods may also be used. The OTF path is then tested by GCAC and, if the OTF path is found to be acceptable, in step 308, the call is set-up on that path and that path is added to the cache 18 in accordance with the ordering/replacement policy selected for the source node. That is, depending on the policy, the new path may be placed in the cache without replacing any other cache path, or the new path may replace an existing cache path.

Accordingly, the route caching method of the present invention advantageously reduces the computational load on the processor resources of the node by requiring the node to compute a new path (OTF), only when no cached route satisfies the requirements of the connection request. Thus, the call blocking at the source node, due to processor resource overload, is significantly reduced.

The following is a description of some illustrative order/replacement policies that may be employed according to the invention. It is to be appreciated that the present invention is not limited to these exemplary policies, nor the metrics employed therein. Generally, assuming the use of AW and AvCR as policy metrics, a balance is sought to be achieved between choosing a path with the lowest AW but which also satisfies the requirement that the AvCR be greater than or equal to the GCAC equivalent bandwidth. The following are examples of policies that may be used. In a first policy, the source node 10' simply employs no ordering and a last-in first-out replacement policy. In this first policy, no particular metric is necessary. In a second policy, paths are ordered by non-decreasing AW, with ties broken by the AvCR value such that a path with a higher AvCR is chosen over one with a lower AvCR, while an OTF path always replaces the highest AW path with the lowest AvCR, i.e., last path in ordered cache. In a third policy, paths are ordered as in the second policy, while an OTF path replaces a cache path only if the AW of the OTF path is smaller than the largest AW path in the cache. In a fourth policy, paths are ordered as in the second policy, while an OTF path replaces a cache path only if the AW of the OTF path exceeds the AW of the shortest path by less than a selectable parameter value.

The following table, Table III, shows results associated with a simulation run using the W8N network shown in FIG. 4, with the second order/replacement policy described above.

TABLE III

| Scenario | Path Fail Ratio (%) |
|---|---|
| Baseline (N = 1) | 11.4 |
| Caching (N = 3) | 4.99 |

According to the invention, a cache is initialized having N cache paths for each destination. It is to be understood that this value of N is not related to the variable N described above with respect to GCAC. In this particular case, the two scenarios simulated are: (i) a baseline scenario representing one path stored for each destination (N=1), and (ii) a caching scenario according to the invention, where three cache paths are stored for each destination (N=3). Note that N is a programmable parameter. Table III shows the performance of this caching policy in terms of the fraction of times that a connection set-up fails to find a path from the cache. The baseline scenario (row 1) indicates a path fail ratio of 11.4% with no multiple path cache. By employing even a relatively small cache having three cache paths for each destination, it can be seen that there is more than a 50% reduction in the failure to find a path and, thus, more than a 50% reduction in real-time cost over the baseline scenario. Even greater improvement is possible with larger caches. It is to be appreciated that these particular results were calculated using the previously-mentioned RopeSIM™ platform.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. Apparatus comprising:
a packet switch configured for determining an equivalent bandwidth for use in a call admission control process, the equivalent bandwidth being derived from a multiplier which is a function of at least one connection parameter, wherein the multiplier is selected from a plurality of candidate multipliers, the candidate multipliers being computed and stored prior to the call admission control process.

2. The apparatus of claim 1, wherein the packet switch is further configured for receiving a connection request including the at least one connection parameter.

3. The apparatus of claim 2, wherein the packet switch is further configured for accessing at least one look-up table based on the at least one connection parameter to find the multiplier appropriate for the call.

4. The apparatus of claim 3, wherein the packet switch is further configured for multiplying the appropriate multiplier by a selected bandwidth value to yield the equivalent bandwidth.

5. The apparatus of claim 4, wherein the packet switch is further configured for comparing the equivalent bandwidth to an available bandwidth value associated with a link of a path in a network to which the packet switch is operatively coupled.

6. The apparatus of claim 5, wherein the packet switch is further configured for setting-up the call on the path when the available bandwidth value is at least equal to the equivalent bandwidth.

7. The apparatus of claim 5, wherein the packet switch is further configured for rejecting the call with respect to the path when the available bandwidth value is not at least equal to the equivalent bandwidth.

8. The apparatus of claim 1, wherein the at least one connection parameter is a quality of service parameter associated with the call.

9. The apparatus of claim 1, wherein the at least one connection parameter is a delay requirement associated with the call.

10. The apparatus of claim 9, wherein the delay requirement is a cell delay variation requirement.

11. The apparatus of claim 1, wherein the multiplier is also a function of a normalized bandwidth value associated with the call.

12. The apparatus of claim 1, wherein the multiplier is also a function of at least one network parameter.

13. The apparatus of claim 1, wherein the packet switch is further configured for use in a PNNI architecture.

14. Apparatus comprising:
packet equipment configured for determining an equivalent bandwidth for use in a call admission control process, the equivalent bandwidth being derived from a multiplier which is a function of at least one connection parameter, wherein the multiplier is selected from a plurality of candidate multipliers, the candidate multipliers being computed and stored prior to the call admission control process.

15. Apparatus for performing call admission control for a requested connection in a packet network, comprising:
packet equipment configured for computing a network link utilization capacity value and a probability value in response to the requested connection, the network link utilization capacity value being a function of the number of constant bit rate connections at a given link and the utilization of a constant bit rate capacity, and the probability value representing the likelihood that a delay value is less than a cell delay variation value associated with the connection, the packet equipment further configured for accepting a candidate path in the network on which to set-up the connection when the utilization capacity value is not more than a given utilization value and the probability is not more than a given likelihood value.

16. The apparatus of claim 15, wherein the utilization capacity value is a function of the current utilization of a type of connection service on the network link.

17. The apparatus of claim 15, wherein the utilization capacity value is a function of a capacity allocated to a type of connection service on the network link.

18. The apparatus of claim 15, wherein the utilization capacity value is a function of an available bandwidth value on the network link.

19. The apparatus of claim 15, wherein the probability value is a function of the number of connections of a type of connection service currently at the network link.

20. A method for use in a packet switch in a communications network, comprising the steps of:
receiving a connection request; and
determining an equivalent bandwidth for use in a call admission control process, the equivalent bandwidth being derived from a multiplier which is a function of at least one connection parameter, wherein the multiplier is selected from a plurality of candidate multipliers, the candidate multipliers being computed and stored prior to the cal admission control process.

21. The method of claim 20, wherein the connection request includes the at least one connection parameter.

22. The method of claim 21, further comprising the step of accessing at least one look-up table based on the at least one connection parameter to find the multiplier appropriate for the call.

23. The method of claim 22, further comprising the step of multiplying the appropriate multiplier by a selected bandwidth value to yield the equivalent bandwidth.

24. The method of claim 23, further comprising the step of comparing the equivalent bandwidth to an available bandwidth value associated with a link of a path in the network.

25. The method of claim 24, further comprising the step of setting-up the call on the path when the available bandwidth value is at least equal to the equivalent bandwidth.

26. The method of claim 24, further comprising the step of rejecting the call with respect to the path when the available bandwidth value is not at least equal to the equivalent bandwidth.

27. The method of claim 20, wherein the at least one connection parameter is a quality of service parameter associated with the call.

28. The method of claim 20, wherein the at least one connection parameter is a delay requirement associated with the call.

29. The method of claim 28, wherein the delay requirement is a cell delay variation requirement.

30. The method of claim 20, wherein the multiplier is also a function of a normalized bandwidth value associated with the call.

31. The method of claim 20, wherein the multiplier is also a function of at least one network parameter.

32. The method of claim 20, wherein the packet switch is configured for use in a PNNI architecture.

33. A method for use in packet equipment for performing call admission control for a requested connection in a packet network, comprising the steps of:

computing a network link utilization capacity value and a probability value in response to the requested connection, the network link utilization capacity value being a function of the number of constant bit rate connections at a given link and the utilization of a constant bit rate capacity, and the probability value representing the likelihood that a delay value is less than a cell delay variation value associated with the connection; and accepting a candidate path in the network on which to set-up the connection when the utilization capacity value is not more than a given utilization value and the probability is not more than a given likelihood value.

34. The method of claim 33, wherein the utilization capacity value is a function of the current utilization of a type of connection service on the network link.

35. The method of claim 33, wherein the utilization capacity value is a function of a capacity allocated to a type of connection service on the network link.

36. The method of claim 33, wherein the utilization capacity value is a function of an available bandwidth value on the network link.

37. The method of claim 33, wherein the probability value is a function of the number of connections of a type of connection service currently at the network link.

* * * * *